(12) United States Patent
Pignataro et al.

(10) Patent No.: US 12,452,131 B2
(45) Date of Patent: Oct. 21, 2025

(54) ENERGY-AWARE TOPOLOGY

(71) Applicant: Cisco Technology, Inc., San Jose, CA (US)

(72) Inventors: Carlos Pignataro, Cary, NC (US); Pascal Thubert, Roquefort les Pins (FR); Eric A Voit, Bethesda, MD (US); Nagendra Kumar Nainar, Morrisville, NC (US); Marcelo Yannuzzi, Nuvilly (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/194,253

(22) Filed: Mar. 31, 2023

(65) Prior Publication Data

US 2024/0333590 A1 Oct. 3, 2024

(51) Int. Cl.
*H04L 41/0833* (2022.01)
*H04L 41/12* (2022.01)

(52) U.S. Cl.
CPC .......... *H04L 41/0833* (2013.01); *H04L 41/12* (2013.01)

(58) Field of Classification Search
CPC ......... H04L 43/08; H04L 45/22; H04L 45/70; H04L 45/655; H04L 12/66;
(Continued)

(56) References Cited

U.S. PATENT DOCUMENTS 7,924,728 B2 * 4/2011 Riga .................. G01D 21/00
 709/225
2005/0159111 A1 * 7/2005 Kim .................. H04L 45/00
 455/67.14
(Continued)

FOREIGN PATENT DOCUMENTS

KR 20110071504 A 6/2011

OTHER PUBLICATIONS

PCT/US2024/021232 filed Mar. 22, 2024 International Search Report and Written Opinion dated Jun. 13, 2024.
(Continued)

*Primary Examiner* — Dustin Nguyen
(74) *Attorney, Agent, or Firm* — Rutan & Tucker, LLP

(57) ABSTRACT

A network of devices can be stabilized by administering an energy-aware topology that corresponds to a desired state derived in part from one or more sustainability metrics. Devices suitable for stabilization can include a processor, a memory, a plurality of elements, a communication port coupled with one or more neighboring devices, and an energy-aware topology logic. The energy-aware topology logic can monitor incoming traffic from one or more neighboring devices, receive current state data associated with the plurality of elements, and receive update data from the one or more neighboring devices via a sustainability-related augmented IGP. Also, the energy-aware topology logic can generate a desired state for the device based on at least the received current state data and update data. One or more of the plurality of elements may be modified in response to the generated desired state, wherein the modification involves changing one or more sustainability-related capabilities.

19 Claims, 9 Drawing Sheets

(58) Field of Classification Search
CPC ..... H04L 41/0816; H04L 45/00; H04L 45/08; H04L 45/16; H04L 45/26; H04L 41/0813; H04L 41/145; H04L 45/28; H04L 67/51; G06F 11/3058; H04W 40/10; H04W 52/0235; H04W 4/70; H04W 24/02; H04W 28/0221; H04W 36/249; H04W 40/12; H04W 36/0083; A01G 31/02; G01D 21/00

See application file for complete search history.

(56) References Cited

U.S. PATENT DOCUMENTS

| | | | | |
|---|---|---|---|---|
| 2009/0067331 | A1* | 3/2009 | Watsen | H04L 45/655 |
| | | | | 370/235 |
| 2010/0284287 | A1 | 11/2010 | Venuto | |
| 2011/0128131 | A1* | 6/2011 | Kim | H04L 12/66 |
| | | | | 340/286.02 |
| 2013/0064127 | A1* | 3/2013 | Wang | H04L 45/70 |
| | | | | 370/252 |
| 2015/0023363 | A1* | 1/2015 | Hui | H04L 45/16 |
| | | | | 370/408 |
| 2015/0098338 | A1* | 4/2015 | Bhattacharya | H04L 45/22 |
| | | | | 370/241.1 |
| 2015/0127733 | A1* | 5/2015 | Ding | H04W 4/70 |
| | | | | 709/204 |
| 2016/0006649 | A1* | 1/2016 | Chiang | H04L 45/28 |
| | | | | 370/225 |
| 2016/0212698 | A1* | 7/2016 | Guo | H04W 40/10 |
| 2016/0226757 | A1* | 8/2016 | Dharmadhikari | H04L 43/08 |
| 2017/0019861 | A1* | 1/2017 | Rubenstein | H04L 45/26 |
| 2018/0183874 | A1* | 6/2018 | Cook | H04L 41/145 |
| 2018/0198680 | A1* | 7/2018 | Mladin | H04L 41/0816 |
| 2019/0007888 | A1* | 1/2019 | Li | H04W 40/12 |
| 2019/0259108 | A1* | 8/2019 | Bongartz | A01G 31/02 |
| 2020/0154339 | A1* | 5/2020 | Singh | H04L 67/51 |
| 2021/0111988 | A1* | 4/2021 | Plate | H04L 45/08 |
| 2022/0225126 | A1* | 7/2022 | Ma | H04W 24/02 |
| 2022/0311675 | A1 | 9/2022 | Uskudar et al. | |
| 2022/0353163 | A1 | 11/2022 | Ramamurthi et al. | |
| 2023/0017632 | A1* | 1/2023 | Herb | G06F 11/3058 |
| 2023/0362056 | A1* | 11/2023 | Lucas | H04L 41/0813 |
| 2024/0205875 | A1* | 6/2024 | Wang | H04W 36/249 |
| 2024/0224175 | A1* | 7/2024 | Karaki | H04W 28/0221 |
| 2024/0244521 | A1* | 7/2024 | Yi | H04W 52/0235 |
| 2024/0298225 | A1* | 9/2024 | Hyde | H04W 36/0083 |

OTHER PUBLICATIONS

Raffaele Bolla et al: "Energy Efficiency in the Future Internet: A Survey of Existing Approaches and Trends in Energy-Aware Fixed Network Infrastructures", IEEE Communications Surveys & Tutorials, IEEE, USA, vol. 13, No. 2, Apr. 1, 2011 (Apr. 1, 2011).

* cited by examiner

| FLAG | DESCRIPTION |
|---|---|
| 0 | ELEMENT CAN GO INTO SLEEP MODE |
| 1 | ELEMENT CAN RUN IN SLOW-MOTION (UNDERCLOCK) |
| 2 | ELEMENT CAN GO INTO CONTROL PLANE SLEEP MODE |
| 3 | ELEMENT CAN TOGGLE THE POWER SOURCE |
| ⋮ | ⋮ |

FIG. 3

ENERGY-AWARE TOPOLOGY

The present disclosure relates to networking. More particularly, the present disclosure relates to administering an energy-aware topology to stabilize a network of devices around a desired state derived in part from one or more sustainability metrics.

BACKGROUND

With the ever-increasing number of computing devices, energy consumption has become a significant concern as it is one of the highest operating costs in communication networks. However, the source of that energy has also become an important concern due to climate change and sustainability considerations. With the rapid growth in the number and communication speed of communication networks, there has been a significant increase in data traffic, and thus in energy consumption.

The current reality is that overall energy usage by the telecommunication industry may need to come down as the industry consumes between 2-3% of global energy currently. Many national governments are mandating businesses adhere to energy reforms with a global goal to reduce greenhouse gas emissions. A growing number of communication network operators have taken a leading role in sustainability, by, for example, using renewables to meet or exceed decarbonization goals. The many solutions to enhance network energy efficiency fall into two major groups: increasing the use of alternative energy sources to reduce dependence on the main power grid, and network load optimization to reduce energy consumption.

Different devices within a network may use different energy sources during operation, and variable parameters such as location, energy source availability, and/or binding contracts or service level agreements can determine how the devices can be powered. Moreover, different energy sources may use different types of fuel to produce energy. Some examples include, but are not limited to, solar energy, coal energy, or fossil fuel energy. However, current network routing, topology distribution, and control do not consider sustainability-related metrics when making decisions regarding their operation.

SUMMARY

According to an aspect of the present disclosure, a device for administering an energy-aware topology to stabilize a network of devices corresponding to a desired state (derived in part from one or more sustainability metrics) is disclosed. The device can include a processor, a memory commutatively coupled to the processor, a plurality of elements, a communication port coupled with one or more neighboring devices, and an energy-aware topology logic. The energy-aware topology logic can monitor incoming traffic from the one or more neighboring devices, receive current state data associated with the plurality of elements, receive update data from the one or more neighboring devices, generate a desired state for the device based on at least the received current state data and update data, and modify one or more of the plurality of elements in response to the generated desired state.

In some embodiments, the energy-aware topology logic can receive at least one bitmap associated with the one or more neighboring devices.

In a number of embodiments, the bitmap can indicate a plurality of capabilities of the one or more neighboring devices.

In several embodiments, the update data can include at least one current state of the one or more neighboring devices.

In an embodiment, the at least one current state is associated with at least one capability of the plurality of capabilities of the one or more neighboring device.

In further embodiments, the at least one capability can be a sustainability-related capability.

In yet further embodiments, the energy-aware topology logic can receive eco certification data.

In additional embodiments, the energy-aware topology logic can receive current power source data.

In a number of embodiments, generating the desired state is based on at least the monitored incoming traffic, the received current state data, the received update data, the received eco certification data, and the received current power source data.

In certain embodiments, the device further includes a forwarding logic to advertise data to the one or more neighboring devices.

In further embodiments, the energy-aware topology logic can monitor the state of the one or more modified elements, generate update data based on the desired state and the monitored modified elements, and pass the update data to the forwarding logic for forwarding to the one or more neighboring devices.

In another embodiment, the energy-aware topology logic can generate an efficiency global metric.

In still a further embodiment, the state data can include current power configurations.

In certain embodiments, the modification of the one or more of the plurality of elements includes entering a lower power mode.

Alternatively, in some embodiments, the modification of the one or more of the plurality of elements includes shutting down the element.

In further embodiments, the desired state of the device is based on a selected path algorithm.

In yet further embodiments, the update data is received via one or more interior gateway protocols.

According to another aspect of the present disclosure, a device for generating a desired path for communication is disclosed. The device can include a processor, a memory commutatively coupled to the processor, and a communication port coupled with one or more neighboring devices. The neighboring devices can include at least a plurality of elements, such as, but not limited to a node, a line card, a chip serving a link, the link itself, a GPU, ports, ASICs, or other components, logics, or modules within the device. In some embodiments, the device further includes a forwarding logic to advertise data to the one or more neighboring devices and an energy-aware topology to monitor incoming traffic and receive update data from the one or more neighboring devices, generate a first desired state for the one or more neighboring devices, and pass the first desired state to the forwarding logic for advertisement to the one or more neighboring devices. In further embodiments, the update data can include at least one or more sustainability metrics. In yet further embodiments, the first desired state is based on at least the monitored incoming traffic and received update data and is configured to modify at least one of the plurality of elements in response to the generated desired state.

In additional embodiments, the energy-aware topology logic can wait a predetermined amount of time, monitor new incoming traffic, and receive new update data from the one or more neighboring devices, and generate a second desired state for the one or more neighboring devices. The first desired state can be based on at least the monitored new incoming traffic and update data.

According to another aspect of the present disclosure, a method to stabilize a network of two or more devices is disclosed. The method can include monitoring incoming traffic to a first networking device, receiving the current state data of a plurality of elements within the first network device, receiving update data from at least a second networking device, receiving power source data and eco certifications associated with the first networking device, generating a desired state for the network based on at least: the monitored incoming traffic, the received current state data, the received update data, and the received power source data and eco certifications. The method can further include implementing the desired state within the first networking device, monitoring the modified elements, and advertising the desired state to the at least second networking device. The desired state can include one or more settings to modify at least one element in the first networking device. In an embodiment, update data can include at least a list of sustainability metrics and capabilities.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The description will be more fully understood with reference to the following figures, which are presented as exemplary embodiments of the invention and should not be construed as a complete recitation of the scope of the invention, wherein:

FIG. 3 is a chart of an exemplary bitmap capturing the sustainability-related capabilities of a network device in accordance with an embodiment of the disclosure;

Figure 1:
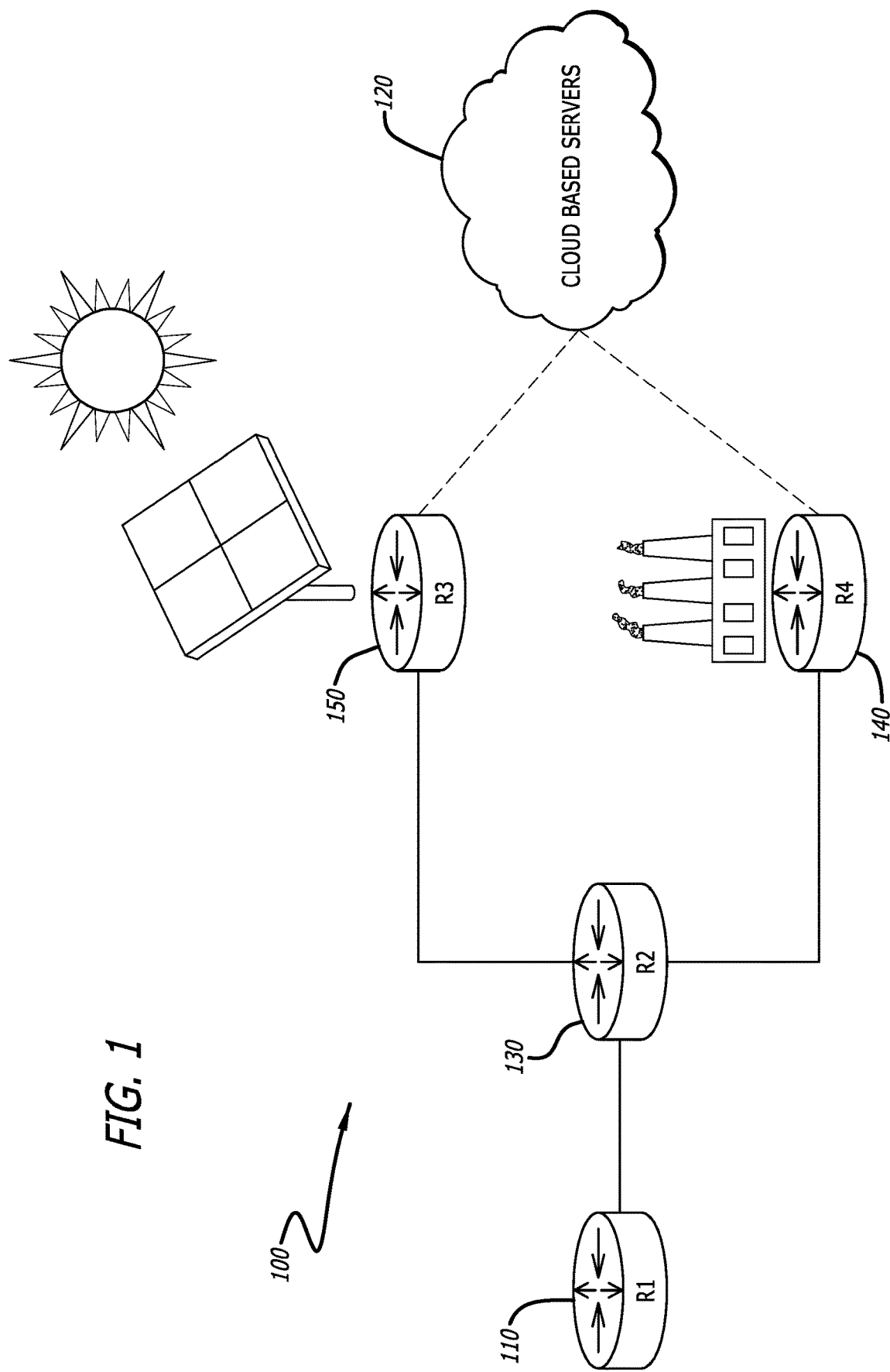
FIG. 1 is a conceptual diagram of a network comprising multiple network devices with various sources of power in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above, devices, systems, and methods are discussed herein that augment the topology distribution characteristic of a network with sustainability-related characteristics, such as, but not limited to, energy savings, consumption moderating, and/or power source and path selection. To communicate messages related to this process, an augmentation of an interior gateway protocol (IGP) can be performed to add additional metrics. In many embodiments, the metrics are introduced to augment the topology distribution and path selection using power source awareness to improve the efficiency of the topology.

Broadly, an IGP is a type of routing protocol that is used to exchange routing information within systems, such as, but not limited to, an Autonomous System (AS), which can be controlled by a single organization, such as a company or a university. An IGP can be responsible for determining the best path for data packets to travel within the system. There are several types of IGPs, including Routing Information Protocol (RIP), Open Shortest Path First (OSPF), Intermediate System to Intermediate System (IS-IS), among others.

Utilizing an augmented IGP can be a part of an overall Traffic Engineering (TE) control process. TE control is considered the process of optimizing the performance of a network by controlling the flow of data through it. TE control involves the use of various techniques to manage the distribution of network traffic in a way that maximizes network capacity and minimizes congestion. TE control can be achieved through the use of specialized protocols, such as augmented IGPs. Other techniques used in TE control may include path selection algorithms, traffic shaping, and load balancing. Often, an overarching goal of TE is to help network operators manage their network resources more effectively, enabling them to provide better service to their customers and ensure that network traffic is distributed in the most efficient way possible.

One element that can aid in TE is the use of a Path Computation Element (PCE). A PCE is often a functional component that is responsible for computing and selecting paths through a network. It is commonly used in TE applications, where it helps to optimize the use of network resources and improve the performance of the network. It may do this by communicating with other network elements, such as routers and switches, to gather information about the network topology, traffic flows, and other relevant parameters. Based on this information, the PCE can compute optimal paths for traffic to follow through the network, taking into account factors such as bandwidth availability, link utilization, and other network constraints. In some embodiments, the PCE can also make dynamic adjustments to the path selection process based on real-time changes in network conditions, such as link failures or congestion. By providing centralized path computation and control, the PCE can help to reduce network congestion, improve network efficiency, and provide better Quality of Service (QOS) for network traffic.

The metrics that are added within an augmented IGP can be utilized to generate an overall desired state of the network and related topology which can affect and/or improve TE metrics. However, the desired state can vary greatly depending on a number of factors including, but not limited to, network device locations, power source type, environmental impact of the power sources, etc. These sustainability-related metrics can be aggregated, compared, or otherwise processed to help generate an overall desired state of a plurality of network devices.

In additional embodiments, one or more of the plurality of network devices within a given network may have one or more sustainability-related capabilities. This may include, but is not limited to having a sleep mode, being able to fully disconnect one or more connections, etc. These capabilities can be shared, broadcast, or otherwise advertised to neighboring devices within the network. Likewise, the plurality of network devices can often have a current state associated with one, more, or all of the elements within the network device. Elements may comprise, but are not limited to, a node, a line card, a chip serving a link, the link itself, a GPU, ports, ASICs, or other components, logics, or modules within the device. The state of all or some of these elements may also be advertised to neighboring network devices.

These sustainability-related capabilities may be advertised through the transmission of one or more bitmaps to neighboring devices via a link-state distribution. However, those skilled in the art will recognize that other methods of transmission may be utilized without exceeding the spirt and scope of the instant disclosure. In a number of embodiments, the bitmap can be advertised over the IGP. In additional embodiments, sustainability-related metrics can be advertised over the IGP as well. These sustainability protocols are discussed in more detail below, but can relate to one or more measurements related to pollution, climate change, or the current device efficiency.

These advertised sustainability-related capabilities and metrics can be received by one or more network devices and utilized to generate a variety of data. In some embodiments, an Efficiency Global Metric (EGM) can be generated as a function that compares the device efficiency local metrics (DELM) from multiple devices within the network topology with the power efficiency improvements on the overall topology. In certain embodiments this can be accomplished by moving part of the traffic or shutting down certain elements exposed by the devices, including perhaps the device itself.

For example, Device A may have a DELM of 100 W/Gb and transmits 5 Gb of traffic, resulting in the first device consuming 500 W. On the other hand, if a second device exhibits a DELM of 90 W/Gb, and transmits 3 Gb, then the second device consumes 270 W. The feature parity between the first and second devices may result in increasing the consumption of power to 350 W in the second device if the traffic is redirected from the first device to the second device.

Thus, EGM can be used to compute and assess whether leaving the traffic in its current state results in a "greener" or more sustainable outcome (e.g., consuming less power generated by fossil fuels) than redirecting the traffic from the second device to the first device. In further embodiments, the desired state of the device is based on a path algorithm. Path algorithms are generally built on top of graph search algorithms and explore routes between nodes (such as a router or other network device), starting at one node and traversing through relationships until the destination is reached.

These generated metrics may be transmitted as updates to neighboring devices with the network topology. In this way, certain embodiments of network devices can not only generate desired states of operation for that particular device but may advertise their capability and update data to influence neighboring devices. In this way, the convergence to a stabilized network topology may occur faster. Indeed, neighboring devices may be able to utilize the advertised sustainability-related capabilities of its neighbors to signal or otherwise request that one or more of those capabilities be activated based on a desired generated state. Additional data received may provide more insight into the power consumption and traffic ingress and egress which can further aid in the generation of a desired state for that network device receiving the update data.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual diagram of a network 100 comprising multiple network devices with various sources of power in accordance with an embodiment of the disclosure is shown. The network 100 can include a plurality of devices, e.g., routers 110, 130, 140 and 150, which can be in communication with each other and/or a remote server, such as a cloud-based server 120. Traditionally, devices in communication networks have used grid-supplied energy as a primary power source consisting primarily of pollution-heavy power such as coal-based generated power. However, modern power grids have more diverse and cleaner power sources for the generated power. Some devices can still be powered by power sources that utilize fossil fuels, such as the router R4 140 as depicted in FIG. 1. Alternatively, some devices can operate by using renewable sources of energy, such as the router R3 150 which is conceptually depicted as being powered by solar power.

It may be desirable in certain applications to minimize the utilization of power generated from one or more higher emission sources. Thus, there can be a need to be aware of the source of energy provided at each device along the route of data travel. Once known, the optimal method of traversing the data may need to be calculated. As discussed in more detail, this path algorithm can be utilized better optimize the locations utilized within a network for data travel. However, as the network becomes more complex, the interactions between local network devices can be affected by these sustainability-related issues. As discussed in more detail below, an overall desired state can be determined with settings related to neighboring devices.

Although a specific embodiment for a network 100 is described above with respect to FIG. 1, any of a variety of systems and/or processes may be utilized in accordance with embodiments of the disclosure. For example, the network could be broken into a plurality of partitions, wherein each partition could have specific needs, service level agreements, etc. that can alter sustainability-optimization. The elements depicted in FIG. 1 may also be interchangeable with other elements of FIGS. 2-8 as required to realize a particularly desired embodiment. Augmented protocols to carry out these described processes are described below.

Figure 2:
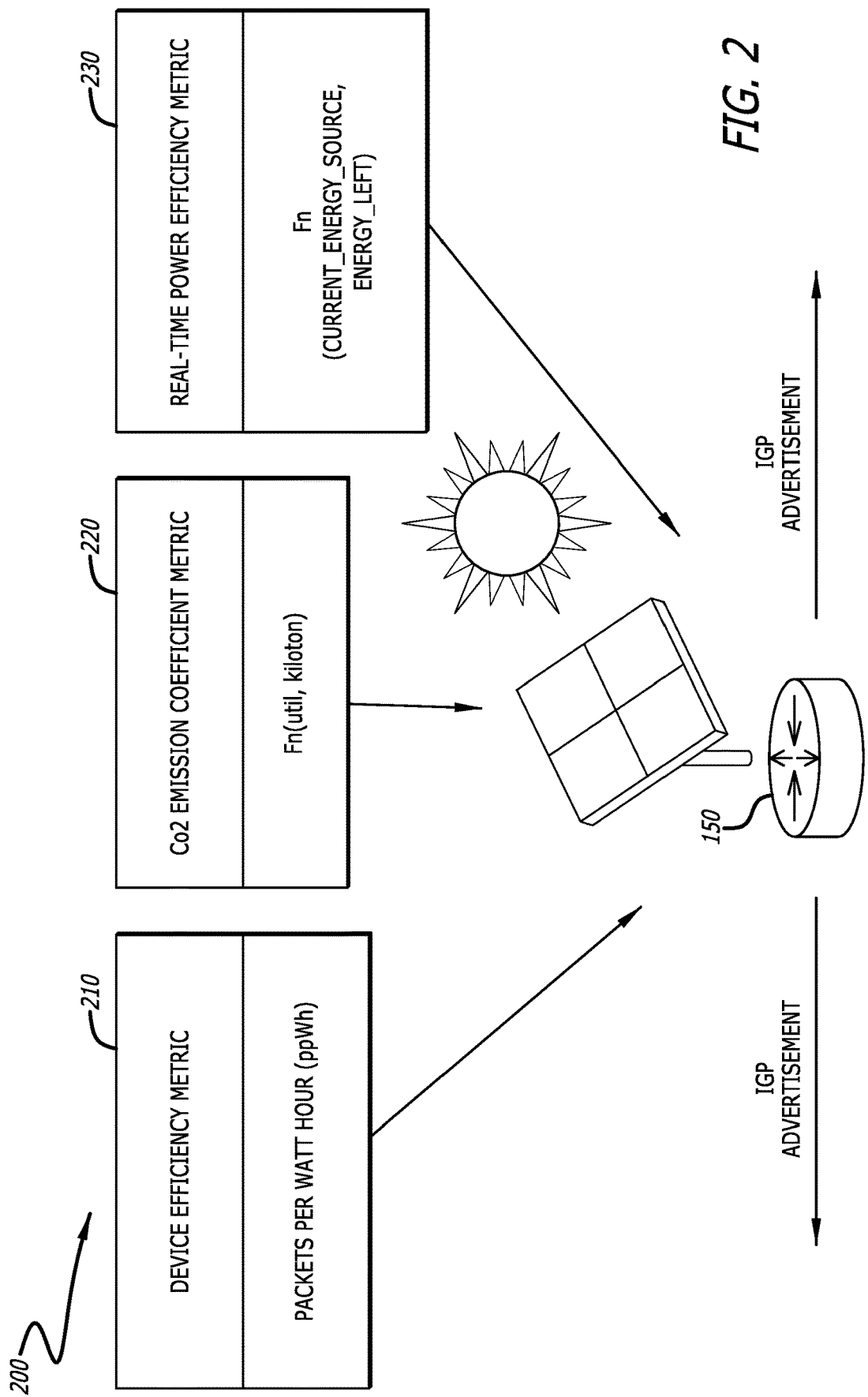
FIG. 2 is a conceptual diagram of an augmentation of an interior gate protocol with sustainability metrics in accordance with an embodiment of the disclosure.

Referring to FIG. 2, a conceptual diagram of an augmentation 200 of an interior gate protocol with sustainability metrics in accordance with an embodiment of the disclosure is shown. A network device, such as a router 150, can transmit, broadcast, or otherwise "advertise", its capability or state to other devices. Such advertisements can occur in a number of ways. In many embodiments, the advertisement can be done via a suitable protocol, such as, but not limited to, an interior gateway protocol (IGP). Typically, an IGP is a dynamic route update protocol used between routers that run on TCP/IP hosts within a single autonomous system. Routers or other network devices can use this protocol to exchange information about IP routes or other data. The IGP can include data related to Routing Information Protocol (RIP), Open Shortest Path First (OSPF), and/or IPv6.

In some embodiments, by using the IGP, the router 150 can advertise data associated with device efficiency metric 210 which can be calculated based on a number of packets of data transmitted per energy consumed (W/h). Additionally, in further embodiments, by using the IGP, the router 150 can advertise data associated with $CO_2$ emission coefficient metric 220 which can be a function of utility per kiloton of emitted $CO_2$. Additionally, in more embodiments, through the use of augmenting the IGP, the router 150 can advertise data associated with a real-time power efficiency metric 230 which can be calculated as a function of current energy sources and the remaining energy.

In a number of embodiments, the augmented metrics can be configured to describe the routing of data with at least an energy source awareness. Types of data that can be included within the sustainability-related metrics can comprise device efficiency local metrics, energy source emission factor (when available), energy source, canary stamp signature/sign, geo-location, and or a real-time power efficiency metric. However, as those skilled in the art will recognize, the exact sustainability-related metrics can vary greatly over time depending on the application desired.

Although a specific embodiment for a network 100 is described above with respect to FIG. 1, any of a variety of systems and/or processes may be utilized in accordance with embodiments of the disclosure. For example, the network could be broken into a plurality of partitions, wherein each partition could have specific needs, service level agreements, etc. that can alter sustainability-optimization. The elements depicted in FIG. 1 may also be interchangeable with other elements of FIGS. 2-8 as required to realize a particularly desired embodiment. Augmented protocols to carry out these described processes are described below.

Referring to FIG. 3, a chart of an exemplary bitmap 300 capturing the sustainability-related capabilities of a network device in accordance with an embodiment of the disclosure is shown. Generally, a bitmap is an array that maps from some domain (for example, a range of integers) to another. As shown in FIG. 3, the bitmap 300 can include an integer indicator, "flag" 310, and a description 320, and each flag 310 corresponds to a description 320. For example, as shown in the embodiment depicted in FIG. 3, the bitmap 300 can include a flag "0" 310a that corresponds to the description "element can go into sleep mode" 320a. Likewise, another flag "1" 310b can correspond to a description "element can run in slow-motion mode (underclock) 320b, while a third flag "2" 310c can correspond to the description "element can go into control plane sleep mode" 320c. Finally, a fourth flag "3" 310d can correspond to a description "element can toggle the power source" 320d. Obviously, those skilled in the art will recognize that the bitmap 300 depicted in FIG. 3 is shown as including four flags and four descriptions but may include any suitable number of flags and description based on the desired application or the capabilities of the device the bitmap 300 is describing.

Figure 4:
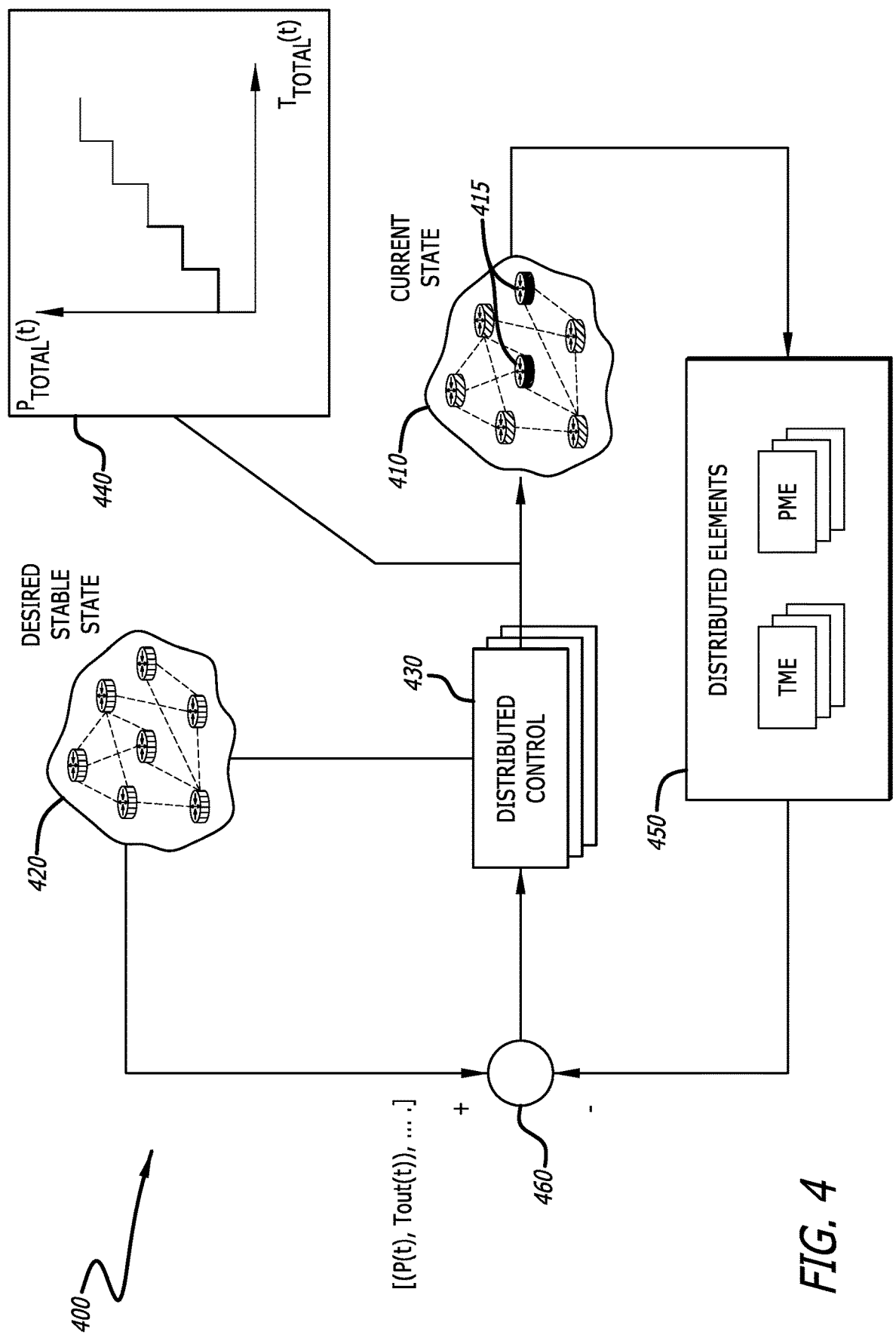
FIG. 4 is a conceptual diagram depicting the stabilization of a network with an energy-aware topology in accordance with an embodiment of the disclosure.

Referring to FIG. 4, a conceptual diagram depicting a process 400 for stabilizing a network 410 with an energy-aware topology in accordance with an embodiment of the disclosure is shown. In many embodiments, various devices, such as routers 415 can be communicatively coupled together within a network 410. The network 410 conceptually depicted in FIG. 4 is a network in a current state which includes two routers 415 which are not optimally configured in relation to one or more sustainability settings. In such embodiments, the process 400 can include one or more distributed controls 430 that can be configured to determine a desired stable state 420 for the network 410. As will be discussed in more detail below, the distributed control 430 can be realized through the use of one or more energy-aware topology logics that can run one or more comparisons 460 to determine a difference between the two states and generate a desired state that can be utilized to bring the current state toward the desired stable state 420.

However, those skilled in the art will recognize that the embodiment depicted in FIG. 4 is simplified and presented at a broad conceptual level to convey the scope of the embodiments described herein. For example, the network may comprise a larger number of routers and include many other types of network devices on either the provider end or consumer end. Additionally, the distributed control 430 may be localized within each device and/or the comparison 460 can be configured to analyze more sets of input data, attributes, etc. The remaining elements described in regard to the embodiment depicted in FIG. 4 are for presentation of a broad understanding of the scope and can be implemented in a variety of ways depending on the desired application.

In many embodiments, the comparison 460 can be configured to converge on a stable network based on one or more sustainability-related metrics or goals. In additional embodiments, a plurality of methods may be utilized to processes the sustainability-related capabilities of devices within a network, which can often be transmitted through IGP bitmaps. For example, some embodiments may be associated with a vendor-signed identifier for one or more consumption portfolios which could be downloaded as needed by one or more elements within the devices receiving the bitmaps.

The comparison can also include evaluating a plurality of power and state data related to a plurality of elements within a device or other network devices. In a variety of embodiments, the comparison 460 may utilize the power states (shown as P(t)) as well the traffic states (shown as Tout(t)) of one or more elements to generate a desired state for a given device within the network 410, such as the router 415. These states can be placed within the network as distributed elements 450. In most embodiments, the distributed elements are components within the one or more devices within the network 410. Additionally, the distributed elements 450 may include or be associated with one or more monitoring elements, such as traffic monitoring elements (shown as TME), and power monitoring elements (shown as PME). Those skilled in the art will recognize that power monitoring elements may also be considered as or implemented as energy monitoring elements (EMEs). Because energy can be considered as power multiplied by a particular time interval, energy may also be tracked within the process 400.

Finally, in order to avoid any oscillations or similar problems within the process of stabilizing the network, one or more step functions 440 may be employed. In some embodiments, a hysteresis mechanism may be utilized as well or in lieu of the step function(s) 440. For example, the attributes, update data, etc. that is advertised within the network 410 may be tuned to random time periods and undergo one or more desynchronization techniques to avoid any undesired oscillation in the configuration of the elements within the sustainability-related capabilities associated with the bitmaps, routing, and/or the resulting traffic.

To that end, the distributed control 430 can monitor incoming traffic to a first networking device, such as a router 415. The distributed control 430 can further receive the current state data of a plurality of elements within the router 415 or other network devices within the network 410. The current state of the element can indicate mode of operation of the element, the current power usage, and/or state. For example, the current state of an element can be whether the device is in a sleep mode, in a slow-motion mode, or some other mode of operation based on a sustainability-related capability, etc. The element can be a node, a module, a link, a chip serving a link, a network or communication interface, a CPU/GPU, or any other part of a network device such as, but not limited to, a router 415.

Figure 5:
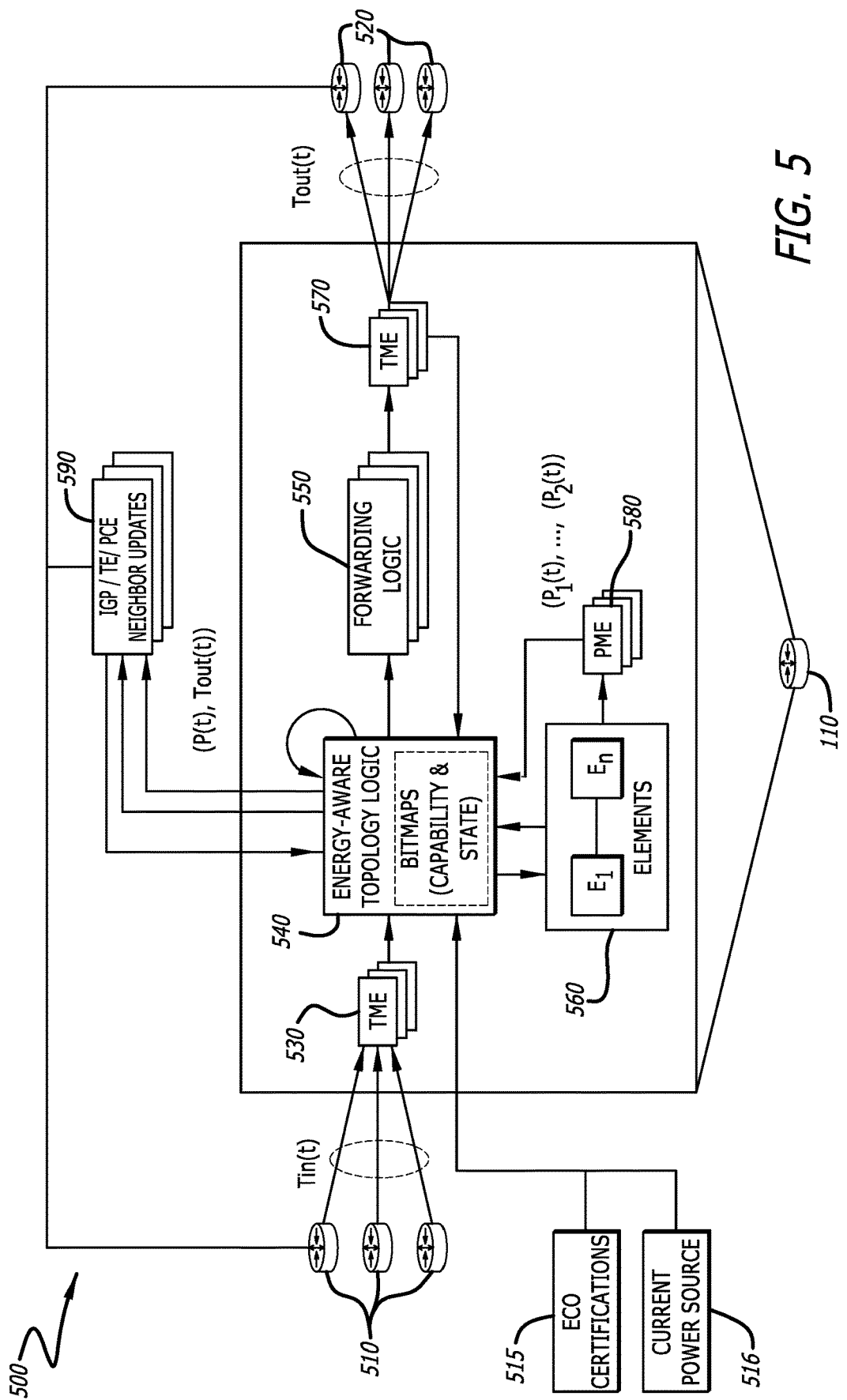
FIG. 5 is a conceptual diagram of a network device suitable for operating under an energy-aware topology in accordance with an embodiment of the disclosure.

Referring to FIG. 5, a conceptual diagram of a network device 500 suitable for operating under an energy-aware topology in accordance with an embodiment of the disclosure is shown. In the embodiment depicted in FIG. 5, the network device is a router 110 that undergoes a process of stabilizing toward a generated desired state based on various inputs. The router 110 depicted in FIG. 5 includes a processor (not shown), a memory commutatively coupled to the processor (not shown), a plurality of elements 560 $E_1, \ldots, E_n$, a communication port coupled with one or more neighboring devices (not shown), and an energy-aware topology logic 540.

The energy-aware topology logic 540 can monitor incoming traffic Tin(t) from one or more neighboring devices 510 and receive current state data associated with the plurality of elements 560. The incoming traffic Tin(t) from the one or more neighboring devices 510 can be measured by one or more traffic monitoring elements (TME) 530. The energy-aware topology logic 540 can further receive power consumption $P_1(t), \ldots, P_n(t)$ of each of the plurality of elements 560 $E_1, \ldots, E_n$. In a number of embodiments, the power consumption $P_1(t), \ldots, P_n(t)$ can be measured by power monitoring elements (PMEs) 580. In some embodiments, the energy-aware topology logic 540 can compute, assess, or estimate the power consumed by the TMEs 530 and PMEs 580 themselves to calculate the aggregated power consumption and traffic association with the router 110. It should be noted that, the power consumed by the TMEs 530 and PMEs 580 may vary depending on which features are desired for measurement, the overall sampling frequency and/or the number or type of elements that need to be measured.

The data generated by the TMEs 530 and PMEs 580 can, in certain embodiments, be fed into one or more tables associated with a bitmap related to one or more sustainability-related capabilities and states. In some embodiments, the energy-aware topology logic 540 can take the power consumption and state of the measurements made by the TMEs 530 and PMEs 580 into account when processing data and/or generating a desired state. In this way, the effects of the measurements themselves can be disregarded, yielding a more accurate assessment of the current state of the device and/or network.

In further embodiments, the energy-aware topology logic 540 can receive update data from the neighboring devices 510, 520. For example, the update data can include related to incoming traffic, capabilities of a neighboring device 510, 520 or any other update data associated with the stabilization of the network. In a variety of embodiments, the update data can be received directly to the network device through an inter-gateway protocol or some equivalent messaging system. As depicted in the embodiment shown in FIG. 5, the neighboring devices 510, 520 both communicate update data to the router 110 via a series of IGP/TE/PCE neighbor updates 590. These types of updates can include augmented sustainability-related metrics, which are disclosed above in more detail within the discussion of FIG. 2.

In several embodiments, the update data can include at least one current state of the neighboring devices 510, 520. In additional embodiments, the current state can be associated with at least one capability of the one of the neighboring devices, the amount of power and traffic output of various elements, etc. In still further embodiments, the capability can be a sustainability-related capability. The sustainability-related capability can, for example, include the efficiency local metric, the energy source emission factor, the geo-location, and the power efficiency metric, as discussed above. In certain embodiments, the update data can include data allowing for the inference of topological information within the network as well as transitive sustainability-related capabilities, including through bitmaps. However, the update data may also include in some embodiments, device efficiency local metrics, energy source emission factors, geo-locations, real-time power efficiency metrics, as well as aggregated power consumption (P(t)) and output traffic data (Tout(t)).

In yet further embodiments, the energy-aware topology logic 540 can receive eco certification data 515 and current power source data 516. The current power source data 516 can be formatted to indicate what power sources are available for various elements within the network, e.g., fossil fuel, renewable, and/or the overall carbon footprint or greenhouse gas mix of each power source. The current power source data 516 may also include relative proportions of energy source data when a public energy provider is being used. Finally, the energy-aware topology logic 540 can also be configured to receive current power configurations from the plurality of PMEs.

In most embodiments, the energy-aware topology logic 540 can utilize a variety of input data to generate a desired state for the device. The desired state may also indicate a type of path that traffic within the network could be transmitted through. The energy-aware topology logic 540 can generate the desired state based on at least the received current state data and update data received from the one or more neighboring devices 510. However, in more embodiments, the energy-aware topology logic 540 can utilize all available input data to generate a desired state including, but not limited to, the incoming traffic data, the current power usage data (which can be combined with the traffic data to yield current state data), update data, eco certifications, neighboring device sustainability-related capabilities, augmented sustainability metrics (received from the update data), and a selected path algorithm.

In response to the generated desired state, the energy-aware topology logic 540 can modify one or more of the plurality of elements 560 $E_1, \ldots, E_n$. In a number of embodiments, the modification of the one or more of the plurality of elements 560 $E_1, \ldots, E_n$ can include entering a lower power mode. Alternatively, in some embodiments, the modification of the one or more of the plurality of elements 560 $E_1, \ldots, E_n$ can include shutting down the element. That is, if an element of the plurality of elements 560 $E_1, \ldots, E_n$ is deemed to be unnecessary under current network conditions, i.e., the element is not being utilized sufficiently and/or the incoming traffic is not passing through the element, then the energy-aware topology logic 540 can modify the element by changing the current state of the element to a lower power mode or sleep mode.

In some embodiments, the energy-aware topology logic 540 can receive at least one bitmap associated with the one or more neighboring devices. The bitmap can indicate a plurality of capabilities of the one or more neighboring devices. The received bitmap can be an array as shown in FIG. 3. For example, the bitmap can include an array of flags, i.e., integer indicators, indicating the possible state of the element ("element can go into sleep", "element can run in slow-motion (underclock)", "element can go into control plane sleep mode", "element can toggle the power source", etc.

In certain embodiments, the device 500 further includes a forwarding logic 550. In some embodiments, the forwarding logic 550 may be configured to advertise data to the neighboring devices 510 and 520. For example, new routing or traffic configurations may be push to the forwarding logic 550. In further embodiments, the energy-aware topology logic 540 can monitor the state of the modified elements and generate update data based on these post-modification results. Subsequently, the energy-aware topology logic 540 can pass the update data through one or more messaging protocols, such as the IGP/TE/PCE neighbor updates 590 as depicted in FIG. 5. Ultimately, the generated update data can be received by one or more of the neighboring devices 510 and 520.

In another embodiment, the energy-aware topology logic 540 can generate an efficiency global metric. The data received by the energy-aware topology logic 540 can include topology details along with the various metrics that are collected to compute the efficiency global metric (EGM). EGM can be a function that compares the DELM from multiple devices within the network with the power efficiency improvements on the overall topology by moving part of the traffic or shutting down certain elements exposed by the network devices, including the device 500 itself. Examples of how this comparison of DELMs associated with multiple devices is discussed above.

However, in certain embodiments, an EGM can be used to compute and assess whether leaving the traffic in its current state results in a "greener" outcome (e.g., consuming less power generated by fossil fuels) than redirecting the traffic from the second device to the first device. In further embodiments, the desired state of the device is based on a path algorithm. Path algorithms are generally built on top of graph search algorithms and explore routes between nodes (such as a router or other network device), starting at one node and traversing through relationships until the destination is reached.

The path algorithm can select the path based on a set of criteria. The set of criteria can include: (i) the Shortest-Greenest Path (SGP): to that end, the energy-aware topology logic 540 determines the greenest paths, and then selects the shortest path among them as the desired state; (ii) the Greenest-Shortest Path (SGP): to that end, the energy-aware topology logic 540 determines the shortest paths, and then selects the greenest path among them as the desired state; (iii) the Greenest Path (GP): to that end, the energy-aware topology logic 540 determines the greenest paths as the desired state; and (iv) the Shortest Path (SP): to that end, the energy-aware topology logic 540 determines the shortest paths as the desired state. In some embodiments, the energy-aware topology logic 540 determines the desired state based on any other alternative criteria.

In additional embodiments, the energy-aware topology logic 540 can wait a predetermined amount of time and then monitor new incoming traffic from the neighboring devices 510. In such embodiments, the energy-aware topology logic 540 can receive new update data from the neighboring devices and generate a second desired state for the neighboring devices. In an embodiment, the first desired state can be based on at least the monitored new incoming traffic and update data. The monitoring may also be triggered in response to a certain event, such as, but not limited to, a request received from a neighboring device, or a sudden change in network traffic or topology.

Figure 6:
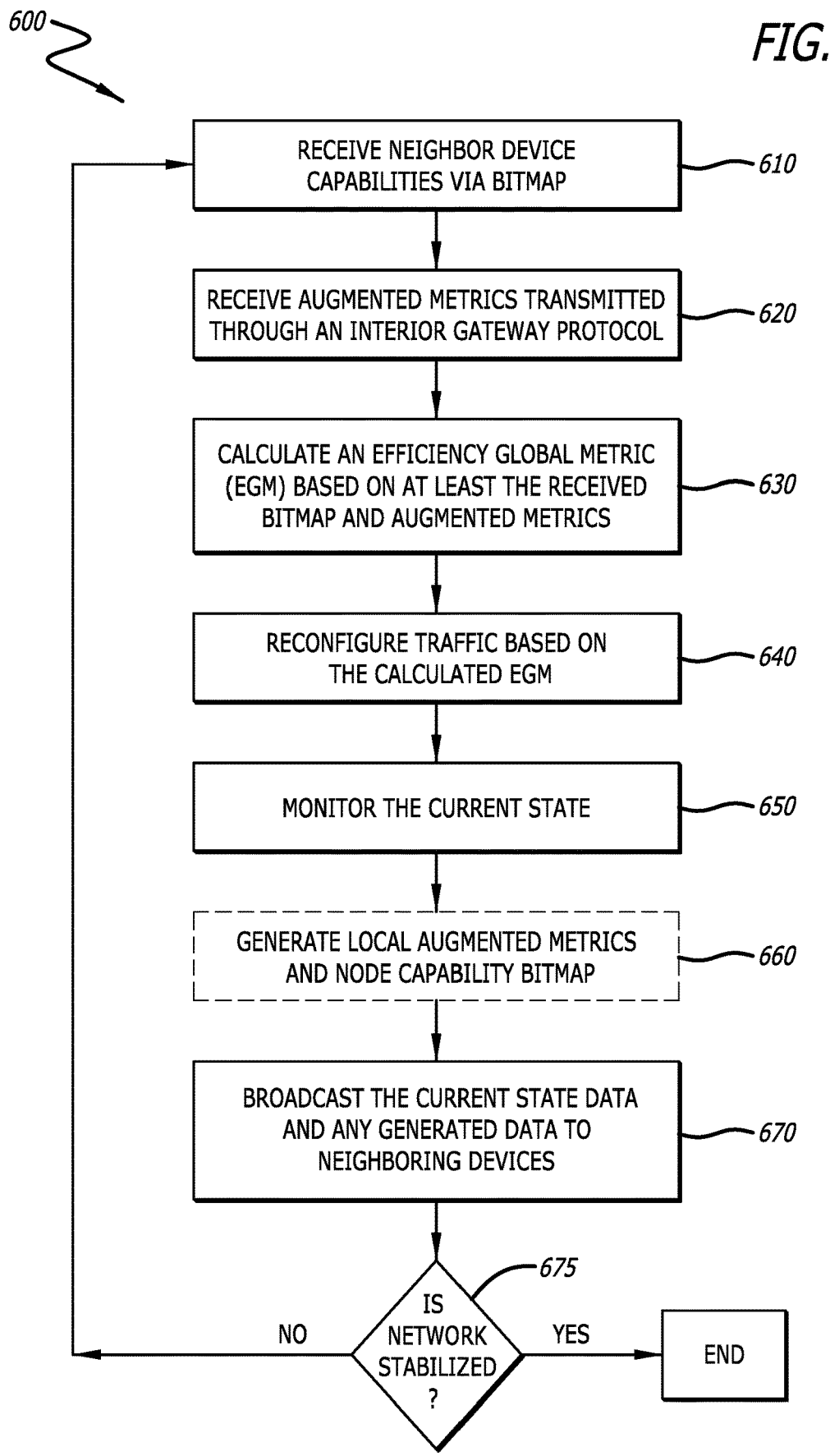
FIG. 6 is a flowchart depicting a process for stabilizing a network within an energy-aware topology in accordance with an embodiment of the disclosure.

Referring to FIG. 6, a flowchart depicting a process 600 for stabilizing a network within an energy-aware topology in accordance with an embodiment of the disclosure is shown. In many embodiments, the process 600 can receive neighbor device capabilities via bitmap, (block 610). In certain embodiments, the bitmaps may have been previously transmitted or otherwise delivered or transmitted to various neighboring devices. In further embodiments, the process 600 can receive augmented metrics transmitted through an IGP (block 620). As described above, certain embodiments may receive the augmented metrics via other messaging means. The process 600 can further calculate an EGM based on at least the received bitmap and augmented metrics (block 630). In more embodiments, the process 600 can subsequently reconfigure traffic based on the calculated EGM (block 640). In some embodiments, the reconfiguring of the traffic can be accomplished by changing the power and/or state of a plurality of elements within the device.

In further embodiments, the process 600 can monitor the current state (block 650). Often, this can be done to verify that the reconfiguration has yielded the expected or desired state or output. The monitored current state can often be formatted into current state data. In some optional embodiments, the process 600 can generate local augmented metrics and network device capability bitmaps (block 660). As described above with respect to FIG. 2, the augmented metrics can include sustainability-related metrics. Additionally, the capability bitmap can be formatted to be transmitted or otherwise passed to neighboring device within the network. The capability bitmap can also be formatted similarly to FIG. 3 whereas the bitmap relates to one or more sustainability-related capabilities that the node/network device can perform.

In additional embodiments, the process 600 can broadcast or advertise the current state data and any augmented metrics to the neighboring nodes or devices (block 670). The process 600 can subsequently determine whether the network has become stabilized (block 675). In some embodiments, the network can be considered stable when a given plurality of devices within a network have achieved a stable state or otherwise a state that does not require additional reconfiguring. Upon a determination that the network is not stable, the process can again repeat by receiving additional bitmaps or augmented metrics (blocks 610, 620). However, upon a determination that the network is stable, the process 600 can end.

Figure 7:
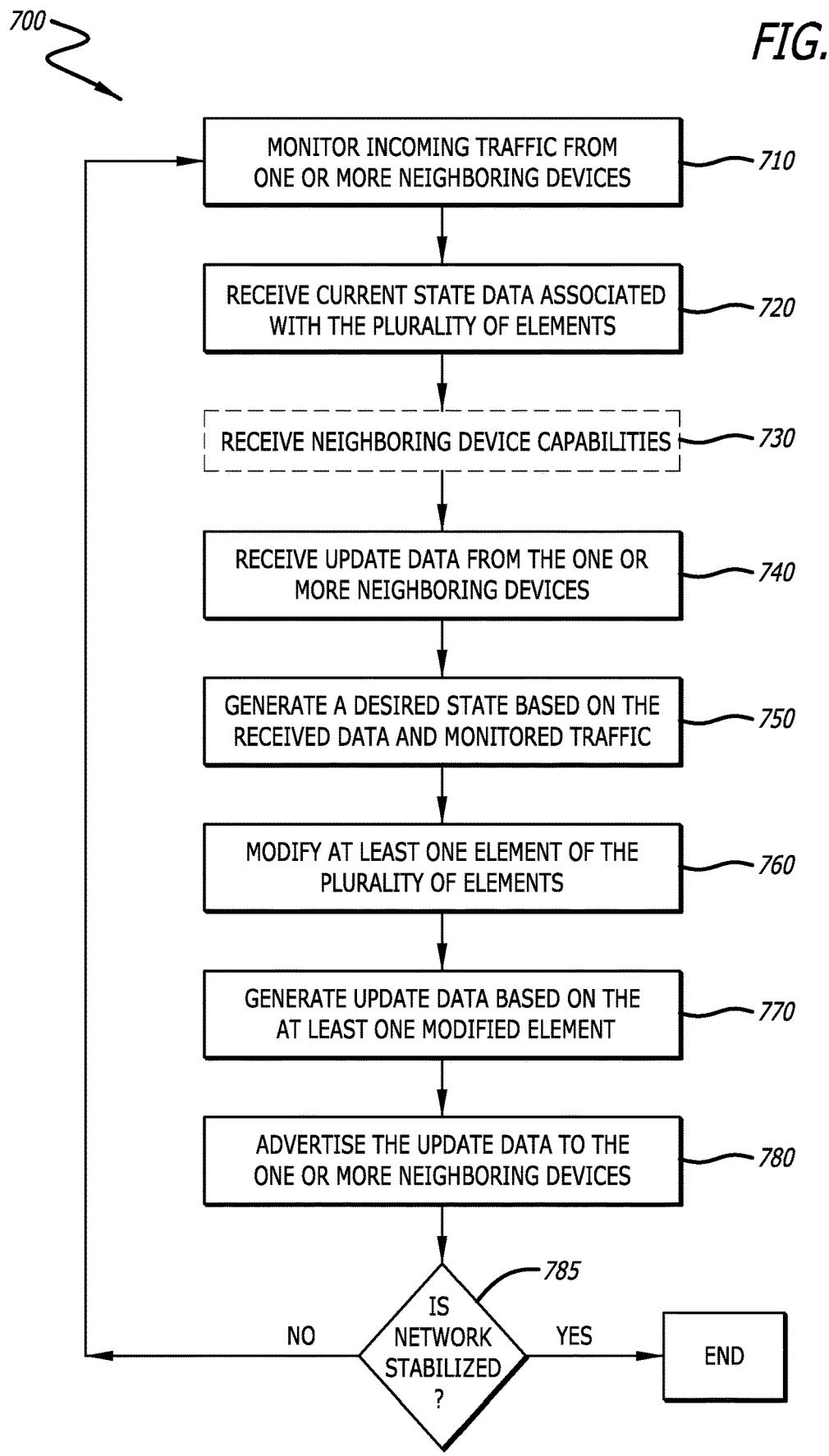
FIG. 7 is a flowchart depicting a process for processing energy-aware topology data within a network device in accordance with an embodiment of the disclosure.

Referring to FIG. 7, a flowchart depicting a process 700 for processing energy-aware topology data within a network device in accordance with an embodiment of the disclosure is shown. In various embodiments, the process 700 can monitor incoming traffic from one or more neighboring devices (block 710). As described above, each device within a network can be comprised of a plurality of elements. In further embodiments, the process 700 can receive current state data associated with the plurality of elements (block 720). In certain embodiments, each of the plurality of elements may include a node, a line card, a chip serving a link, the link itself, a GPU/CPU, or other elements.

In certain optional embodiments, the process 700 can receive neighboring device capabilities (block 730). As described above, these capabilities can be received as a bitmap associated with one or more devices within the network. In a number of embodiments, the process 700 can also receive update data from the one or more neighboring devices (block 740). Update data may be received via an IGP through one or more augmented metrics in certain embodiments. Additionally, the augmented metrics within the update data may include a plurality of sustainability-related metrics. In still more embodiments, the neighboring device may provide data, either as commands, or suggestions, to adjust one or more capabilities within the device. In this way, neighboring devices on a network can influence the sustainability-related capabilities of each other. In some embodiments, the network can be considered stabilized once there are no changes in the update data being received from the neighboring devices.

In further embodiments, the process 700 can generate a desired state based on the received data and monitored traffic (block 750). The desired state can, in certain embodiments, be a list of states and/or power usage levels for the plurality of elements within a device. In some embodiments, the desired states can trigger one or more capabilities that are indicated within a bitmap, as described above. Often, the desired state can include suggestions or commands for neighboring devices which can direct those elements to change or reconfigure their states and/or enable/disable one or more sustainability-related capabilities. In further embodiments, the process 700 can modify at least one element of the plurality of elements (block 760). Often, this is done in response to the desired state being generated, wherein the at least one element of the plurality of elements is modified in order to effectuate the desired state within the device. In several embodiments, the process 700 can generate update data based on the at least modified element (block 770). In many cases, the update data includes actual element states and/or power usage levels and capabilities of the device subsequent to the execution of the modifications.

In additional embodiments, the process 700 can further advertise the update data to the one or more neighboring devices (block 780). Subsequently, the process 700 can determine whether the network is stable or not (block 785). Upon a determination that the network is not stable, the process 700 can continue to monitor incoming traffic from the one or more neighboring devices (block 710). However, upon a determination that the network is stable, then the process 700 can end.

Figure 8:
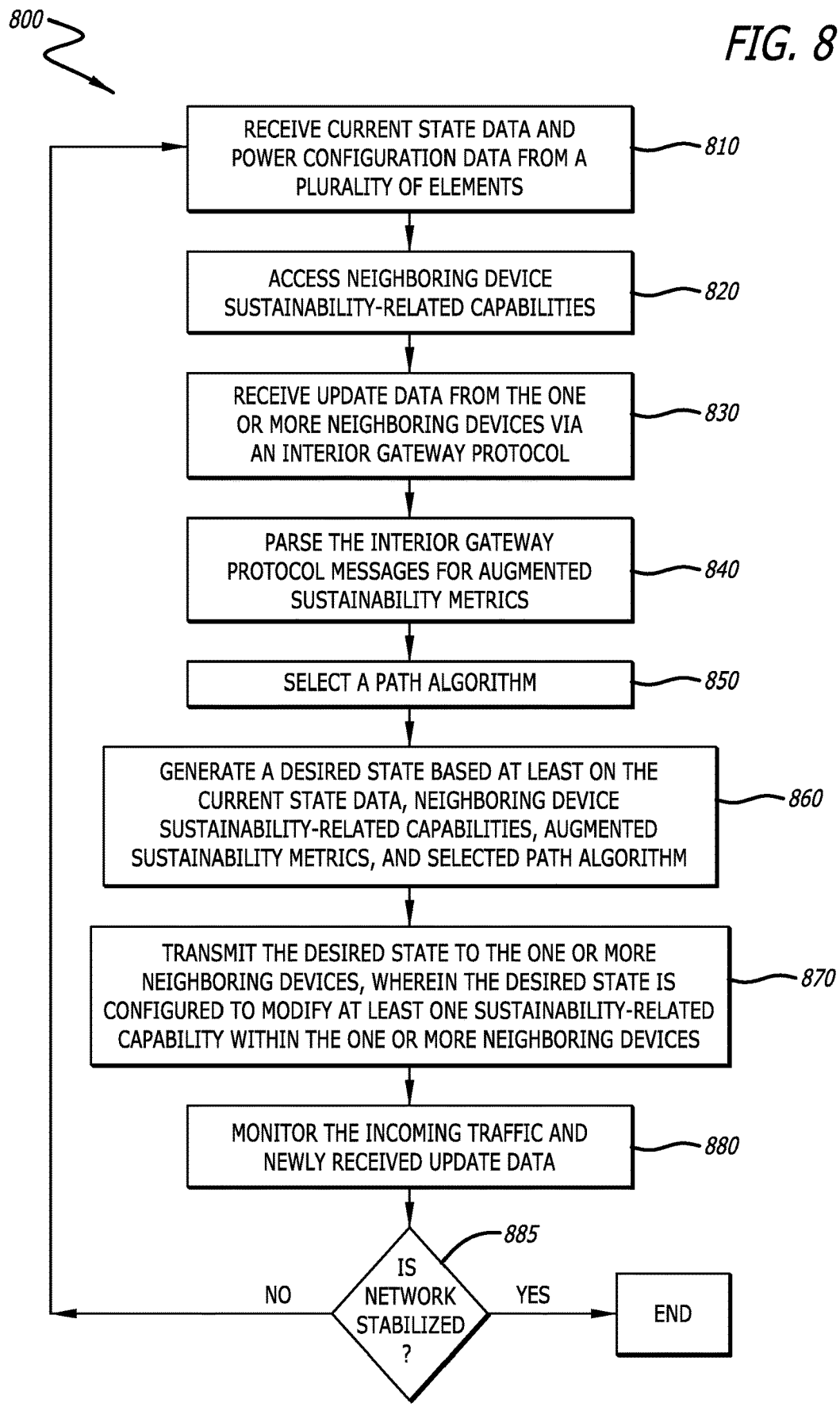
FIG. 8 is a flowchart depicting a more detailed process for generating a desired state within a network device in accordance with an embodiment of the disclosure.

Referring to FIG. 8, a flowchart depicting a more detailed process 800 for generating a desired state within a network device in accordance with an embodiment of the disclosure is shown. In many embodiments, the process 800 can receive current state data and power configuration data from a plurality of elements, (block 810). In more embodiments, the process 800 can access neighboring device sustainability-related capabilities (block 820). As discussed above, the process 800 may receive these capabilities via a bitmap. In further embodiments, the process 800 can receive update data from the one or more neighboring devices via an IGP. The update may, as discussed previously, include a variety of sustainability-related metrics. Those sustainability-related metrics, such as but not limited to the metrics disclosed in FIG. 2 which can be delivered through an augmented set of metrics within the IGP.

In a number of embodiments, the process 800 can subsequently parse the IGP messages for the augmented sustainability metrics (block 840). In various embodiments, the process 800 can select a path algorithm, as shown by block 850. By way of non-limiting examples, the path algorithm may include a shortest-green path (SGP) which selects the greenest paths and then chose the shortest between them; a greenest-shortest path (GSP) which selects the shortest paths and then chooses the greenest one among them; a greenest path (GP) which can select the overall greenest path; a shortest path (SP) which can select the shortest overall path. However, it is contemplated that other path algorithms may be utilized, depending on the application desired.

In additional embodiments, the process 800 can generate a desired state based at least on the current state data, neighboring device sustainability-related capabilities, augmented sustainability metrics, and selected path algorithms (block 860). However, it is contemplated that other embodiments may generate a desired state based on a partial selection of these data or other data. Conversely, additional data may be considered when generating the desired state. In further embodiments, the process 800 can transmit the desired state to the one or more neighboring devices (block 870). As discussed above, the desired state can be utilized to modify various elements within the device that generated the desired state, however additional embodiments may be utilized to modify elements in neighboring devices. Additionally, the desired state can often be configured to modify at least one sustainability-related capability within the one or more neighboring devices.

In still more embodiments, the process 800 can monitor the incoming traffic and newly received update data (block 880). In several embodiments, the process 800 can determine whether the network has stabilized or not (block 885). Upon a determination that the network is has not stabilized, the process 800 can continue to receive new current state and power configuration data (block 810). Alternatively, upon a determination that the network is stable, then the process 800 can end.

Figure 9:
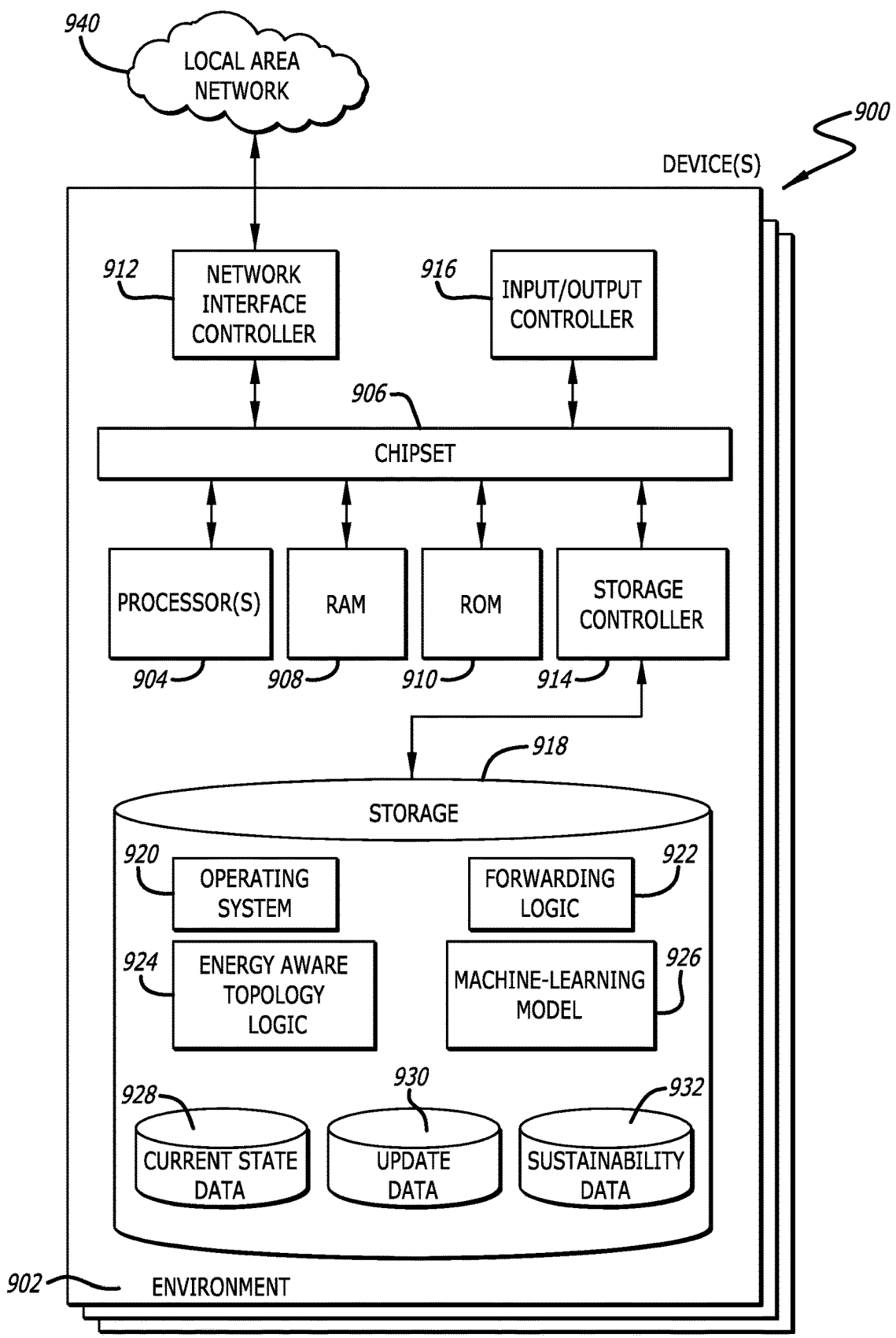
FIG. 9 is a conceptual block diagram of a device suitable for use in with various embodiments of the disclosure.

FF Referring to FIG. 9, a conceptual block diagram of a device suitable for use in with various embodiments of the disclosure is shown. Referring to FIG. 9, a conceptual block diagram of one or more devices 900 suitable for use in a sustainable cross-domain data distribution infrastructure in accordance with various embodiments of the disclosure is shown. In a number of embodiments, the device may be a sustainability aggregation device. The embodiment of the conceptual block diagram depicted in FIG. 9 can illustrate a conventional server computer, workstation, desktop computer, laptop, tablet, network appliance, e-reader, smartphone, or other computing device, and can be utilized to execute any of the application and/or logic components presented herein. The device 900 may, in some examples, correspond to physical devices or to virtual resources described herein.

In many embodiments, the device 900 may include an environment 902 such as a baseboard or "motherboard," in physical embodiments that can be configured as a printed circuit board with a multitude of components or devices connected by way of a system bus or other electrical communication paths. Conceptually, in virtualized embodiments, the environment 902 may be a virtual environment that encompasses and executes the remaining components and resources of the device 900. In more embodiments, one or more processors 904, such as, but not limited to, central processing units (CPUs) can be configured to operate in conjunction with a chipset 906. The processor(s) 904 can be standard programmable CPUs that perform arithmetic and logical operations necessary for the operation of the device 900.

In additional embodiments, the processor(s) 904 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 906 may provide an interface between the processor(s) 904 and the remainder of the components and devices within the environment 902. The chipset 906 can provide an interface to a random-access memory ("RAM") 908, which can be used as the main memory in the device 900 in some embodiments. The chipset 906 can further be configured to provide an interface to a computer-readable storage medium such as a read-only memory ("ROM") 910 or non-volatile RAM ("NVRAM") for storing basic routines that can help with various tasks such as, but not limited to, starting up the device 900 and/or transferring information between the various components and devices. The ROM 910 or NVRAM can also store other application components necessary for the operation of the device 900 in accordance with various embodiments described herein.

Different embodiments of the device 900 can be configured to operate in a networked environment using logical connections to remote computing devices and computer systems through a network, such as the network 940. The chipset 906 can include functionality for providing network connectivity through a network interface card ("NIC") 912, which may comprise a gigabit Ethernet adapter or similar component. The NIC 912 can be capable of connecting the device 900 to other devices over the network 940. It is contemplated that multiple NICs 912 may be present in the device 900, connecting the device to other types of networks and remote systems.

In further embodiments, the device 900 can be connected to a storage 918 that provides non-volatile storage for data accessible by the device 900. The storage 918 can, for example, store an operating system 920, forwarding logic 922, and data, which are described in greater detail below. The storage 918 can be connected to the environment 902 through a storage controller 914 connected to the chipset 906. In certain embodiments, the storage 918 can consist of one or more physical storage units. The storage controller 914 can interface with the physical storage units through a serial attached SCSI (SAS) interface, a serial advanced technology attachment (SATA) interface, a fiber channel (FC) interface, or other type of interface for physically connecting and transferring data between computers and physical storage units.

The device 900 can store data within the storage 918 by transforming the physical state of the physical storage units to reflect the information being stored. The specific transformation of physical state can depend on various factors. Examples of such factors can include, but are not limited to, the technology used to implement the physical storage units, whether the storage 918 is characterized as primary or secondary storage, and the like.

For example, the device 900 can store information within the storage 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 900 can further read or access information from the storage 918 by detecting the physical states or characteristics of one or more particular locations within the physical storage units.

In addition to the storage 918 described above, the device 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 900. In some examples, the operations performed by a cloud computing network, and or any components included therein, may be supported by one or more devices similar to device 900. Stated otherwise, some or all of the operations performed by the cloud computing network, and or any components included therein, may be performed by one or more computer devices 900 operating in a cloud-based arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 918 can store an operating system 920 utilized to control the operation of the device 900. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 918 can store other system or application programs and data utilized by the device 900.

In various embodiment, the storage 918 or other computer-readable storage media is encoded with computer-executable instructions which, when loaded into the device 900, may transform it from a general-purpose computing system into a special-purpose computer capable of implementing the embodiments described herein. These computer-executable instructions may be stored as a program and transform the device 900 by specifying how the processor(s) 904 can transition between states, as described above. In some embodiments, the device 900 has access to computer-readable storage media storing computer-executable instructions which, when executed by the device 900, perform the various processes described above with regard to FIGS. 1-8. In more embodiments, the device 900 can also include computer-readable storage media having instructions stored thereupon for performing any of the other computer-implemented operations described herein.

In still further embodiments, the device 900 can also include one or more input/output controllers 916 for receiving and processing input from a number of input devices, such as a keyboard, a mouse, a touchpad, a touch screen, an electronic stylus, or other type of input device. Similarly, an input/output controller 916 can be configured to provide output to a display, such as a computer monitor, a flat panel display, a digital projector, a printer, or other type of output device. Those skilled in the art will recognize that the device 900 might not include all of the components shown in FIG. 9 and can include other components that are not explicitly shown in FIG. 9 or might utilize an architecture completely different than that shown in FIG. 9.

As described above, the device 900 may support a virtualization layer, such as one or more virtual resources executing on the device 900. In some examples, the virtualization layer may be supported by a hypervisor that provides one or more virtual machines running on the device 900 to perform functions described herein. The virtualization layer may generally support a virtual resource that performs at least a portion of the techniques described herein.

In many embodiments, the device 900 can include an energy-aware topology logic 924. As discussed previously, various devices may be configured to receive, generate, and transmit current states to and from neighboring devices. In fact, the energy-aware topology logic 924 may be configured to carry out any and/or all of the steps, processes, or methods described herein. In certain embodiments, the energy-aware topology logic 924 may be embedded as a separate logic within the device. In additional embodiments, the energy-aware topology logic 924 can be located remotely and be called upon to facilitate operations as described herein.

In a number of embodiments, the storage 918 can include current state data 928. In various embodiments, the energy-aware topology logic 924 can utilize all available input data to generate a desired state including, but not limited to, the incoming traffic data, the current power usage data, which can be combined with the traffic data to yield data that can be stored as current state data 928. Additional current states can be generated based on the current state data 928. In more embodiments, a plurality of elements can have associated current state data that can be received by the device 900. In further embodiments, the current state data 928 may include current power configurations.

In various embodiments, the storage 918 can also include update data 930. The update data 930 can be received by neighboring devices and may contain the current state of those neighboring devices. In certain embodiments, the update data 930 may be combined with the current state data 928 can be combined such that a desired state for the device 900 may be generated. In further embodiments, the update data 930 may be generated based on a desired state and monitored modified elements. The update data 930 may also be accessed or otherwise utilized by the forwarding logic for forwarding to neighboring devices. In a number of embodiments, that forwarding may be accomplished by utilizing one or more interior gateway protocols. In still more embodiments, the update data 930 may comprise at least one or more sustainability metrics as described above.

In still more embodiments, the storage 918 can include sustainability data 932. As described above, sustainability data 932 can comprise a number of metrics, scores, or other data that relates to both power source type data and one or more sustainability-related capabilities within one or more network devices. Power source type data may include one or more negative environmental impacts from using the device, whereas sustainability-related capabilities may provide a list of available configurations for the device that can be adjusted to potentially reduce energy usage over time.

Finally, in many embodiments, data may be processed into a format usable by a machine-learning (ML) model 926 (e.g., feature vectors), and or other pre-processing techniques. The ML model 926 may be any type of ML model, such as supervised models, reinforcement models, and/or unsupervised models. The ML model 926 may include one or more of linear regression models, logistic regression models, decision trees, Naïve Bayes models, neural networks, k-means cluster models, random forest models, and/or other types of ML models 926. In some embodiments, the ML model 926 may be configured to optimize the selection or transmission of current state data 928 or other data through the forwarding logic 922. This may allow for a more efficient transmission of packets across a network.

Although a specific embodiment for a device 900 suitable for use in a sustainable cross-domain data distribution infrastructure is described above with respect to FIG. 9, any of a variety of systems and/or processes may be utilized in accordance with embodiments of the disclosure. For example, the device 900 may be configured to carry out additional operations wherein the energy-aware topology logic 924 is a secondary function of the device 900. In this way, a typical network device may be configured or converted to carry out the steps and processes associated with the sustainability aggregation entities that are described above. In additional embodiments, the device 900 may be virtualized and sold as a service to one or more external networks/domains. The elements depicted in FIG. 9 may also be interchangeable with other elements of FIGS. 1-8 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each, and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device comprising:
   a processor;
   a memory commutatively coupled to the processor;
   a plurality of elements;
   a communication port coupled with one or more neighboring devices of a network; and
   an energy-aware topology logic configured to:
   monitor incoming traffic from the one or more neighboring devices;
   receive at least one network device capability bitmap associated with the one or more neighboring devices, wherein the device capability bitmap is formatted to be transmitted to a neighboring device within the network;
   receive current state data associated with the plurality of elements;
   receive update data from the one or more neighboring devices;
   generate a desired state for the device based on at least the received current state data and the update data;
   modify one or more of the plurality of elements in response to the generated desired state;
   generate one or more augmented metrics and a network device capability bitmap comprising one or more sustainability-related metrics;
   receive the one or more augmented metrics in response to determining that the network is not stable; and
   advertise current state data and the received one or more augmented metrics to the one or more neighboring devices.

2. The device of claim 1, wherein the at least one bitmap is configured to indicate a plurality of capabilities of the one or more neighboring devices.

3. The device of claim 2, wherein the update data comprises at least one current state of the one or more neighboring devices.

4. The device of claim 3, wherein the at least one current state is associated with at least one capability of the plurality of capabilities of the one or more neighboring devices.

5. The device of claim 4, wherein the at least one capability is a sustainability-related capability.

6. The device of claim 1, wherein the energy-aware topology logic is further configured to receive eco certification data.

7. The device of claim 6, wherein the energy-aware topology logic is further configured to receive current power source data.

8. The device of claim 7, wherein generating the desired state is based on at least:
   the monitored incoming traffic;
   the received current state data;
   the received update data;
   the received eco certification data; and
   the received current power source data.

9. The device of claim 1, wherein the device further comprises a forwarding logic, wherein the forwarding logic is configured to advertise data to the one or more neighboring devices.

10. The device of claim 9, wherein the energy-aware topology logic is further configured to:
    monitor a state of the one or more modified elements;
    generate update data based on the desired state and the monitored one or more modified elements; and
    pass the update data to the forwarding logic for forwarding to the one or more neighboring devices.

11. The device of claim 1, wherein the energy-aware topology logic is further configured to generate an efficiency global metric.

12. The device of claim 1, wherein the current state data includes current power configurations.

13. The device of claim 1, wherein the modification of the one or more of the plurality of elements includes entering a lower power mode.

14. The device of claim 1, wherein the modification of the one or more of the plurality of elements includes shutting down an element.

15. The device of claim 1, wherein the desired state of the device is based on a selected path algorithm.

16. The device of claim 15, wherein the update data is received via one or more interior gateway protocols.

17. A device comprising:
 a processor;
 a memory commutatively coupled to the processor;
 a communication port coupled with one or more neighboring devices of a network, wherein the neighboring devices comprise at least a plurality of elements;
 a forwarding logic configured to advertise data to the one or more neighboring devices; and
 an energy-aware topology logic configured to:
  receive a network device capability bitmap associated with the one or more neighboring devices, wherein the device capability bitmap is formatted to be transmitted to a neighboring device within the network;
  monitor incoming traffic from the one or more neighboring devices;
  receive update data from the one or more neighboring devices, wherein the update data comprises at least one or more sustainability metrics;
  generate a first desired state for the one or more neighboring devices, wherein the first desired state:
   is based on at least the monitored incoming traffic and received update data;
   is calculated via at least an efficiency global metric; and
   is configured to modify at least one of the plurality of elements in response to the generated desired state;
  pass the first desired state to the forwarding logic for advertisement to the one or more neighboring devices;
  generate a network device capability bitmap comprising one or more sustainability-related metrics;
  receive an augmented metric in response to determining that the network is not stable; and
  advertise current state data and the augmented metric to the one or more neighboring devices.

18. The device of claim 17, wherein the energy-aware topology logic is further configured to:
 wait a predetermined amount of time;
 monitor new incoming traffic from the one or more neighboring devices;
 receive new update data from the one or more neighboring devices; and
 generate a second desired state for one or more neighboring devices, wherein the first desired state is based on at least the monitored new incoming traffic and update data.

19. A method to stabilize a network of two or more devices, comprising:
 monitoring incoming traffic to a first networking device;
 receiving a network device capability bitmap associated with one or more neighboring devices, wherein the device capability bitmap is formatted to be transmitted to a neighboring device within the network;
 receiving a current state data of a plurality of elements within the first networking device;
 receiving update data from at least a second networking device, wherein the update data comprises at least a list of sustainability metrics and capabilities;
 receiving power source data and eco certifications associated with the first networking device;
 generating a desired state for the network based on at least:
  the monitored incoming traffic;
  the received current state data;
  the received update data; and
  the received power source data and eco certifications;
  wherein the desired state comprises one or more settings to modify at least one element in the first networking device;
 implementing the desired state within the first networking device;
 monitoring the modified elements;
 generating an augmented metric and a network device capability bitmap comprising one or more sustainability-related metrics;
 receiving the augmented metric in response to determining that the network is not stable; and
 advertising the desired state and the augmented metric to the at least second networking device.

* * * * *